(12) United States Patent
Popadiuc

(10) Patent No.: US 10,240,562 B2
(45) Date of Patent: Mar. 26, 2019

(54) MACHINE SYSTEM HAVING SUBMERSIBLE PUMPING SYSTEM, AND METHOD

(71) Applicant: Progress Rail Locomotive Inc., LaGrange, IL (US)

(72) Inventor: Peter Popadiuc, Bensenville, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 324 days.

(21) Appl. No.: 15/333,100

(22) Filed: Oct. 24, 2016

(65) Prior Publication Data

US 2018/0112629 A1    Apr. 26, 2018

(51) Int. Cl.
| | | |
|---|---|---|
| *F02M 21/02* | (2006.01) | |
| *F04B 15/08* | (2006.01) | |
| *F02M 21/06* | (2006.01) | |
| *F17C 9/04* | (2006.01) | |
| *F04B 23/02* | (2006.01) | |

(52) U.S. Cl.
CPC .... *F02M 21/0218* (2013.01); *F02M 21/0215* (2013.01); *F02M 21/06* (2013.01); *F04B 15/08* (2013.01); *F04B 23/021* (2013.01); *F17C 9/04* (2013.01); *F04B 2015/081* (2013.01); *F17C 2227/015* (2013.01); *F17C 2227/0135* (2013.01); *F17C 2227/0142* (2013.01)

(58) Field of Classification Search
CPC ......... F17C 9/04; F17C 2227/0135–2227/015; F17C 2227/0178; F04B 15/08; F04B 23/021
See application file for complete search history.

(56) References Cited

U.S. PATENT DOCUMENTS

| | | | | |
|---|---|---|---|---|
| 2,018,144 A | * | 10/1935 | Mesinger | ................... F04B 5/02 |
| | | | | 137/339 |
| 3,422,765 A | * | 1/1969 | Schoch | ....................... F04B 1/02 |
| | | | | 310/90.5 |
| 4,365,942 A | | 12/1982 | Schmidt | |
| 4,418,544 A | | 12/1983 | Heybutzki et al. | |
| 4,421,464 A | * | 12/1983 | Schmidt | .................. F04B 15/08 |
| | | | | 310/27 |
| 5,566,712 A | * | 10/1996 | White | ........................ B61C 5/00 |
| | | | | 137/587 |
| 6,129,529 A | | 10/2000 | Young et al. | |
| 6,203,288 B1 | | 3/2001 | Kottke | |
| 6,283,720 B1 | | 9/2001 | Kottke | |

(Continued)

FOREIGN PATENT DOCUMENTS

| | | |
|---|---|---|
| CN | 102594087 | 7/2012 |
| CN | 103441648 | 7/2015 |

(Continued)

*Primary Examiner* — Tareq Alosh

(74) *Attorney, Agent, or Firm* — Mattingly Burke Cohen & Biederman

(57) ABSTRACT

A submersible pumping system in a machine system includes a pumping element, and a drive mechanism for actuating the pumping element. The drive mechanism has an electromagnetic element with a superconducting state at or below a critical temperature. A temperature control jacket and cooling mechanism are provided to pump heat from a heat exchange cavity to cool the drive mechanism to or below a critical temperature less than an ambient temperature in a cryogenic environment.

17 Claims, 1 Drawing Sheet

(56) References Cited

U.S. PATENT DOCUMENTS

| | | | |
|---|---|---|---|
| 6,354,087 B1 * | 3/2002 | Nakahara | F17C 13/02 62/6 |
| 6,481,218 B1 * | 11/2002 | Drelser | B60K 15/03006 62/50.6 |
| 6,506,030 B1 | 1/2003 | Kottke | |
| 6,722,866 B1 | 4/2004 | Dresler | |
| 7,416,548 B2 * | 8/2008 | Baust | A61B 18/02 606/20 |
| 7,750,513 B2 | 7/2010 | Witte et al. | |
| 9,206,802 B2 | 12/2015 | Dalziel et al. | |
| 2005/0016185 A1 * | 1/2005 | Emmer | F17C 5/007 62/50.1 |
| 2009/0165640 A1 | 7/2009 | Kawasaki et al. | |
| 2015/0143822 A1 | 5/2015 | Chalmers et al. | |
| 2015/0276133 A1 * | 10/2015 | Ollweiler | F17C 13/00 220/560.04 |
| 2016/0146199 A1 | 5/2016 | Pollard et al. | |
| 2016/0201659 A1 | 7/2016 | Nelson et al. | |
| 2016/0215766 A1 | 7/2016 | Brown et al. | |

FOREIGN PATENT DOCUMENTS

| | | | | |
|---|---|---|---|---|
| CN | 105422413 | | 3/2016 | |
| DE | 102008011456 | | 9/2009 | |
| DE | 10200801667 | | 10/2009 | |
| EP | 3199859 A1 * | | 8/2017 | F17C 6/00 |
| WO | 2009025505 | | 2/2009 | |
| WO | 2015184537 | | 12/2015 | |
| WO | WO 2016102638 A1 * | | 6/2016 | |

\* cited by examiner

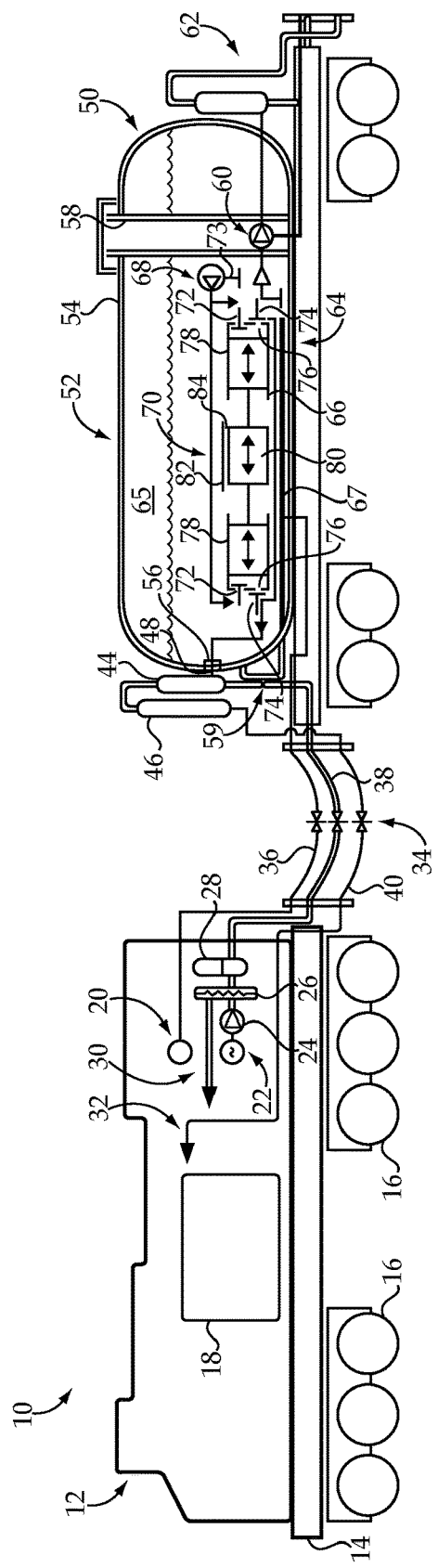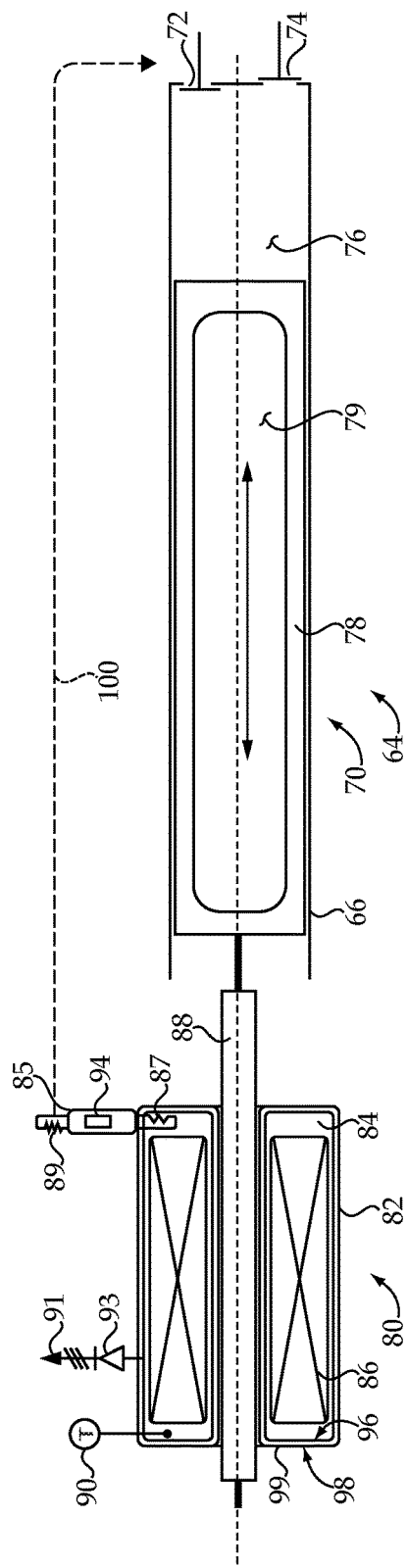

MACHINE SYSTEM HAVING SUBMERSIBLE PUMPING SYSTEM, AND METHOD

TECHNICAL FIELD

The present disclosure relates generally to submersible pumping systems, and more particularly to such a system having a temperature control jacket and a cooler to cool an electric drive mechanism to or below a critical temperature.

BACKGROUND

Cryogenic fluid systems are used in a wide variety of applications, commonly where transport and handling of a material in a liquid state rather than a gaseous state is desired. In recent years, cryogenic fluid systems in the field of internal combustion engines have received increasing interest. Combustible hydrocarbon fuels such as liquefied natural gas (LNG), liquid propane (LP), and still others are known to provide certain advantages over traditional hydrocarbon fuels such as gasoline and diesel, notably with respect to emissions. Economics and resource availability are also factors driving increased attention to technology in this area.

In a typical design a vessel contains a liquefied fuel such as LNG, and is equipped with an apparatus such as a vaporizer or evaporator to transition the fuel from a liquid form to a gaseous form for supplying to cylinders in an engine for combustion. Various systems have been proposed that provide submerged or partially submerged pumps to convey the cryogenic liquid fuel from the storage vessel to the vaporizer equipment. Various challenges are attendant to operating pumps and the like inside of a closed cryogenic storage vessel, however. As with many technical fields, there is also continuing interest in efficiency. German Patent No. DE102008011456A1 relates to a submersible motor driven pump, in a cryogenic environment. The DE '456 patent recognizes as an advantage that resistivity of electrical conducting material decreases greatly in the cryogenic temperature range.

SUMMARY OF THE INVENTION

In one aspect, a machine system includes a machine, a fluid storage vessel, and an outlet conduit coupled with the fluid storage vessel and structured to convey a fluid stored within the fluid storage vessel to the machine. The system further includes a pumping system positioned within the fluid storage vessel so as to be submerged within the stored fluid, and including a housing having formed therein a pumping chamber. The pumping system further includes a pumping element movable within the pumping chamber to transition the stored fluid from the fluid storage vessel to the outlet conduit. The pumping system further includes a drive mechanism for actuating the pumping element, the drive mechanism including an electromagnetic element having an electrical conducting state above a critical temperature and an electrical superconducting state at or below the critical temperature. The drive mechanism further includes a temperature control jacket forming a heat exchange cavity about the electromagnetic element, and a cooler coupled with the temperature control jacket and structured to pump heat from the heat exchange cavity to maintain the electromagnetic element at or below the critical temperature.

In another aspect, a submersible pumping system includes a housing having a pumping chamber positioned fluidly between a pumping inlet and a pumping outlet, and a pumping element movable within the pumping chamber to transition a fluid from the pumping inlet to the pumping outlet. The system further includes a drive mechanism for actuating the pumping element, and including an electromagnetic element having an electrical conducting state above a critical temperature, and an electrical superconducting state at or below the critical temperature. The drive mechanism further includes a temperature control jacket forming a heat exchange cavity about the electromagnetic element, and a cooler coupled with the temperature control jacket and structured to pump heat from the heat exchange cavity to maintain the electromagnetic element at or below the critical temperature.

In still another aspect, a method of operating a fluid system includes pumping heat from a coolant in heat transference contact with a drive mechanism of a pumping system submerged in a stored fluid within a storage vessel in the fluid system. The method further includes cooling an electromagnetic element of the drive mechanism by way of the pumping of the heat from an ambient temperature of the stored fluid to or below a critical temperature of a material forming the electromagnetic element, and energizing the electromagnetic element while cooled to or below the critical temperature.

BRIEF DESCRIPTION OF THE DRAWINGS

FIG. 1 is a side diagrammatic view of a machine system, according to one embodiment; and FIG. 2 is a side diagrammatic view of a submersible pumping system, suitable for use in the machine system of FIG. 1, according to one embodiment.

DETAILED DESCRIPTION

Referring to FIG. 1, there is shown a machine system 10 according to one embodiment, and including a machine 12 having a frame 14 supported by a plurality of rolling elements 16, at least some of which can be traction elements structured for applying traction power to a ground surface or rails. In a practical implementation strategy, machine 12 includes a locomotive, however, the present disclosure is not limited to locomotive or rail applications, or to a mobile machine or machine system at all, for reasons which will be further apparent from the following description. Machine 12 may include a combustion engine 18 such as a gaseous fuel internal combustion engine operated by way of diesel pilot ignition, although the present disclosure is not thereby limited. Engine 18 might be part of a genset, such that operation of engine 18 provides rotational power for rotating a generator (not shown) that is part of or coupled with an electrical system 20 of machine system 10. A generator operated in this manner could be coupled with traction motors structured to drive rolling elements 16, in a generally conventional manner. Engine 18 could also be operated to directly drive rolling elements 16 by way of suitable mechanical apparatus. Machine system 10 may also include a fluid system 52, in the illustrated case a cryogenic fluid system mounted upon a tender car 50 that is coupled with and towed by machine 12, having details and features further discussed herein. As will be further apparent from the following description, features and operating capabilities of fluid system 52 are considered to provide various advantages over conventional machine systems in the rail context, and elsewhere. It is thus contemplated that fluid system 52 may be a part of or coupled with a fuel system 22 of machine system 10, for fueling engine 18 to propel machine 12 and any associated rail cars or the like, and provide operational power for machine system 10 generally. In other contexts, fluid system 52 could be used in a marine application or a stationary application, such as for operating a stationary genset, a pump, a compressor, or in various manufacturing or industrial settings that are altogether different from electric power generation or fluid handling.

Machine system 10 may further include a glycol system 22 including a pump 24, a heat exchanger or radiator 26 and an expansion tank 28, that operate to circulate glycol or another heat exchange fluid to a vaporizer 44 for vaporizing stored cryogenic fluid pumped from cryogenic storage vessel 54. A main fuel flow 32 from fuel conduit 40 to engine 18 is also shown. Fluid coupling hardware 34, including a fuel conduit 40 and a glycol conduit 38, extends between machine 12 and tender car 50 in a generally conventional manner. An electrical conduit 36 likewise extends between machine 12 and tender car 50. Mounted upon tender car 50 is vaporizer 44, coupled by an outlet conduit 48 to a cryogenic fluid outlet 56 of a cryogenic fluid storage vessel 54 of cryogenic fluid system 52. From vaporizer 44 cryogenic fluid, such as cryogenic fuel, can be converted to a gaseous state and fed to or past an accumulator 46 that in turn is fluidly coupled by way of fluid coupling hardware 34 to provide fuel flow 32 to engine 18. In the illustrated embodiment, cryogenic fluid system 52 further includes a cold well 58 formed in cryogenic fluid storage vessel 54. A pumping system 60 is positioned within cryogenic fluid storage vessel 54 and can include some components inside cold well 58 in certain embodiments, or outside of cold well 58 in others. Service personnel can access pumping system 60 by way of closure 58, or another service access location depending upon the particular design employed.

Pumping system 60 may be coupled with distribution and supply equipment 62 for providing fluid, typically converted to gaseous form, to other locations or devices in machine system 10. Pumping system 60 could be a low pressure pumping system structured for fueling equipment not designed for high pressure, such as an engine system in a different locomotive. Another pumping system 64 is positioned within fluid storage vessel 54, and may be positioned adjacent to service port 59. In a further practical implementation strategy, pumping system 64 may be mounted upon a mount in the nature of a rail 67 positioned upon a bottom floor of fluid storage vessel 54. Service personnel can access pumping system 64 by way of service port 59.

Pumping system 64 may further include a first pumping mechanism 68 and a second pumping mechanism 70. Pumping mechanism 68 may include a low-pressure pumping mechanism structured to transition stored cryogenic fluid from an interior volume 65 of fluid storage vessel 54 to pumping mechanism 70, which serves as a high-pressure pumping mechanism. Pumping system 64 may further include a housing 66 having one or more pumping inlets 72 fluidly connected or structured to be fluidly connected with interior storage volume 65. Housing 66 may further include one or more pumping outlets 74 structured to fluidly connect with fluid outlet 56, and one or more pumping chambers 76 fluidly between pumping inlet(s) 72 and pumping outlet(s) 74. Pumping mechanism 70 also includes one or more reciprocable pumping elements 78 movable one within each pumping chamber 76 to transition cryogenic fluid between pumping inlet(s) 72 and pumping outlet(s) 74. It will be appreciated that pumping mechanism 70 is depicted as a dual-piston pump, with pumping elements 78 being about 180 degrees out of phase. The present disclosure is not thereby limited, however, and single-piston pumps, three-piston pumps, swash-plate pumps or still some other pump configuration might be used. Descriptions herein of any pumping system components in the singular or the plural should thus be understood not to exclude the other of the singular or the plural. Pumping elements 78 could operate to pump cryogenic fluid in parallel or could be positioned in fluid series. An electric drive mechanism 80 of pumping system 64 is structured to actuate pumping element 78. Pumping system 64 further includes a temperature control jacket 82 forming a heat exchange cavity 84 about electric drive mechanism 80, structured to contain or convey a coolant such as a cryogenic fluid of the same or a different type as the cryogenic fluid within storage volume 65, or a solid coolant such as a chill plate or other heat exchange apparatus, in heat transference contact with electric drive mechanism 80.

Referring also now to FIG. 2, there are shown additional details of fluid system 52. As noted above, pumping system 64 includes a drive mechanism 80 structured to actuate pumping element 78. In a practical implementation strategy, drive mechanism 80 includes a first electromagnetic element 86 and a second electromagnetic element 88 inductively coupled with first electromagnetic element 86. Temperature control jacket 82 may envelop and fluidly seal about first electromagnetic element 86 but not second electromagnetic element 88. First electromagnetic element 86 may include one or more conductive coils positioned to extend circumferentially around second electromagnetic element 88 in the illustrated embodiment. First electromagnetic element 86 may include a fixed electromagnetic element, and second electromagnetic element 88 may include a movable electromagnetic element. Second electromagnetic element 88 may include permanent magnets, and first electromagnetic element 86 may include a solenoid coil(s).

Those skilled in the art will appreciate from the illustration of FIG. 2 that drive mechanism 80 may have the form of a linear electric motor, and pumping element 78 may include a piston coupled to reciprocate with the linear electric motor. In the illustrated embodiment, pumping element 78 moves back and forth with back and forth movement of second electromagnetic element 88, responsive to changes in an electrical energy state of first electromagnetic element 86, in a generally conventional manner. A second pumping element positioned on the opposite side of drive mechanism 80, which could be identical to the illustrated pumping element in FIG. 2, would be understood to operate in a generally analogous manner. According to the FIG. 2 illustration, pumping element 78 moves to the left to draw cryogenic fluid from volume 65 into pumping chamber 76 by way of pumping inlet 72, and moves to the right to increase a pressure of the cryogenic fluid in pumping chamber 76 and expel the cryogenic fluid out through pumping outlet 74. Each of inlet 72 and outlet 74 may be equipped with an appropriately oriented check valve or the like in a practical implementation strategy. Apart from the motion of second electromagnetic element 88 drive mechanism 80 will generally remain fixed in position, mounted to rail 67, while piston or pumping element 78 reciprocates within housing 66. In the illustrated embodiment, first electromagnetic element 86 extends circumferentially around second electromagnetic element 88, and can be understood as positioned radially outward of second electromagnetic element 88. In other embodiments, a linear electric motor could be structured so that the movable "rotor" is positioned radially outward of the fixed "stator," approximately the opposite of what is depicted in the embodiment of FIG. 2. In still other embodiments, a different type of motor such as a rotating motor could be employed.

As noted above, pumping element 78 reciprocates within housing 66. An internal vacuum cavity 79 may be formed in pumping element 78. It should be appreciated that the clearance between housing 66 and pumping element 78 might be only a few microns, but need not be entirely leak-proof given that pumping system 64 is submerged. In other words, a relatively minor amount of leakage can be well tolerated. A bearing surface could be formed on an outer peripheral surface of pumping element 78. Pumping element 78 and housing 66 may be formed of materials capable of dry lubrication or self-lubrication, such as certain ceramic materials suited to the cryogenic submerged environment. Second electromagnetic element 88 may also include outer bearing surfaces that may be analogously dry lubricated or self-lubricating. It can further be seen from FIG. 2 that temperature control jacket 82 extends between first electromagnetic element 86 and second electromagnetic element 88, and can be formed of or coated with material suitable for dry lubrication or self-lubrication at the interface with bearing surfaces of electromagnetic element 88. Alternatively, cryogenic fluid resident within volume 65 could provide lubrication between pumping element 78 and housing 66 and/or between second electromagnetic element 88 and temperature control jacket 82 or other such parts of drive mechanism 80 as needed. It will be recalled that first electromagnetic element 86 extends circumferentially around second electromagnetic element 88, and may therefore be generally cylindrical. Analogously, temperature control jacket 82 may extend circumferentially around second electromagnetic element 88, and has a generally cylindrical configuration. Alterations to the illustrated embodiment, such as shortening an axial length of temperature control jacket 82 might render a more squat and/or toroidal form, nevertheless still understood as generally cylindrical. In other instances, altogether different geometry of drive mechanism 80 and/or temperature control jacket 82 could be employed, as alluded to above.

FIG. 2 also illustrates a temperature sensor 90 structured to sense a temperature within heat exchange cavity 84, and a pressure venting conduit 91 coupled to temperature control jacket 82 and having a pressure relief valve 93 within pressure venting conduit 91. Pressure relief valve 93 might be a one-way valve structured to open to enable some cooling fluid and/or pressure to be vented either into volume 65 or to atmosphere. Those skilled in the art will appreciate the general desirability and need to manage heat and reject heat produced by way of operating pumping system 64 in the enclosed and contained environment within fluid storage vessel 54.

To this end, as noted above temperature control jacket 82 forms heat exchange cavity 84 about electromagnetic element 86. Drive mechanism 80 further includes a cooler 85 coupled with temperature control jacket 82 and structured to pump heat from heat exchange cavity 84, such as from cooling fluid resident within heat exchange cavity 84, to maintain electromagnetic element 86 at or below a critical temperature. Those skilled in the art will appreciate that electromagnetic element 86 may have an electrical conducting state above the critical temperature and an electrical superconducting state at or below the critical temperature. In a practical implementation strategy, cooling fluid resident within heat exchange cavity 84 may include liquid nitrogen, however, the present disclosure is not thereby limited. The stored fluid resident within storage volume 65 of fluid storage vessel 54 may include a cryogenic fluid other than liquid nitrogen. The cryogenic fluid within storage volume 65 may include a cryogenic fluid hydrocarbon fuel such as liquid natural gas, liquid propane, or another hydrocarbon fuel. As mentioned above, a solid heat transfer element could serve as the coolant from which heat is pumped. Those skilled in the art will also appreciate that liquid nitrogen may have a temperature of about 77 Kelvins or less. The ambient temperature provided by the stored fluid within storage volume 65 will typically be higher, potentially about 100 Kelvins to about 110 Kelvins. In any event, it will be understood that cooler 85 functions to cool electromagnetic element 86 to the critical temperature, which will typically be less than the ambient temperature. Cooler 85 may include a movable element such as a movable piston 94, a first heat exchange element 87 exposed to heat exchange cavity 84, and a second heat exchange element 89 exposed to storage volume 65, for example. Cooler 85 may be any of a variety of solid state electronic or working fluid cooling devices, such as a free piston Stirling engine cooler, a microheat pump of another form, or still another mechanism. In a practical implementation strategy, electromagnetic element 86 includes an electromagnetic coil within heat exchange cavity 84. Electromagnetic element 86 may be part of a stator of drive 80, with inductively coupled electromagnetic element 88 being the rotor. Electromagnetic element 88 can include a solid permanent magnet rotor, such as a neodymium-iron-boron material, of generally known construction. Electromagnetic element 86 may be formed of any suitable known or yet to be discovered high-temperature superconducting (HTS) material. In the illustrated embodiment, only one pumping element 78 is shown coupled to move with electromagnetic element 88, although in alternative embodiments multiple pistons could be coupled with electromagnetic element 88, such as one piston on each side, so that the pistons operate to pump fluid in an alternating manner. Also in a practical implementation strategy, heat exchange cavity 84 may be fluidly sealed from storage volume 65. Temperature control jacket 82 may be double walled, and include a vacuum space 99 between an inner wall 96 and an outer wall 98.

During operation, pressure relief valve 93 may be in a second state much of the time, where heat exchange cavity 84 is blocked from fluid communication with storage volume 65, but adjustable to a first state where heat exchange cavity 84 is in fluid communication with storage volume 65, such as autonomously or controllably in response to pressure and/or temperature in heat exchange cavity 84. Temperature sensor 89 can be used in conjunction with a direct control strategy of pressure relief valve. Fluid vented through pressure relief valve 93 can be discharged outside of fluid storage vessel 54, or in certain cases could be discharged into fluid storage vessel 54. It can further be seen from FIG. 2 that temperature control jacket 82 envelops electromagnetic element 86 but not electromagnetic element 88. Relatively more or less of drive 80 might be enveloped by temperature control jacket 82, so long as electromagnetic element 86 can be cooled to or below a critical temperature.

INDUSTRIAL APPLICABILITY

In FIG. 2, pumping system 64 is shown as it might appear where pumping element 78 has completed or nearly completed an intake stroke, having drawn stored fluid from volume 65 into pumping chamber 76. Electromagnetic element 88 has been drawn toward and through electromagnetic element 86 in a manner conventional with respect to the operation of a linear electric motor. From the state shown in FIG. 2, energizing or de-energizing of electromagnetic element 86, or a change in an energy state otherwise, can be initiated to cause pumping element 78 to commence a pumping stroke, urging fluid from chamber 76 out through valve or pumping outlet 75, and either to another pumping stage or out of fluid storage vessel 54. Electromagnetic element 86 is meanwhile superconducting, producing magnetic fields for inductively interacting with electromagnetic element 88 in a lossless or nearly lossless fashion. Meanwhile, cooler 85 is operated to pump heat from cooling fluid in heat exchange cavity 84, and convey the pumped heat between heat exchange element 87 and heat exchange element 89.

In many cryogenic applications, current commercially available and cost-effective high-temperature superconducting materials become superconductive at about 77 Kelvins or below. In order to maintain the required temperature of solenoid coils/electromagnetic element 86 at or below the critical temperature, they are encapsulated in temperature control jacket 82, and internally cooled via cooler 85. In general, because the temperature inside temperature control jacket 82 is or needs to be maintained less than a temperature within storage volume 65, cooling is generally continuous or quasi-continuous. While superconducting materials can theoretically be employed for lossless operation, in a practical application there are still typically some losses, resulting in heat into the cooling fluid within heat exchange cavity 84. As noted, this heat can be rejected to the stored fluid in storage vessel 54. Thermal power for operating a cooler such as cooler 85 can typically be in a range of about 200 watts or less. The losses associated with operating drive mechanism 80 can likewise be about 200 watts or less. In a typical application, such as the machine application depicted in FIG. 1, a few hundred watts is virtually negligible, however, in some instances storage vessel 54 could be vented to enable some heat rejection, or, alternatively, heat that is pumped out of heat exchange cavity 84 by cooler 85 could be conveyed to pumping inlet 72, for rejection outside of storage vessel 54 and fluid system 52 generally. In FIG. 2, a conduit 100 is shown that could be used to fluidly connect cooler 85, in particular heat exchange element 89, with pumping inlet 72.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A machine system comprising:
    a machine;
    a fluid storage vessel;
    an outlet conduit coupled with the fluid storage vessel and structured to convey a fluid stored within the fluid storage vessel to the machine;
    a pumping system positioned within the fluid storage vessel so as to be submerged within the stored fluid, the pumping system including a housing having formed therein a pumping chamber, and a pumping element movable within the pumping chamber to transition the stored fluid from the fluid storage vessel to the outlet conduit;
    the pumping system further including a drive mechanism for actuating the pumping element, the drive mechanism including an electromagnetic element having an electrical conducting state above a critical temperature and an electrical superconducting state at or below the critical temperature;
    the drive mechanism further including a temperature control jacket forming a heat exchange cavity about the electromagnetic element; and
    a cooler coupled with the temperature control jacket and structured to pump heat from the heat exchange cavity to maintain the electromagnetic element at or below the critical temperature,
    wherein the cooler includes a first heat exchange element within the heat exchange cavity, and a second heat exchange element outside the heat exchange cavity and structured to pump heat to a fluid storage volume of the fluid storage vessel, and the cooler is structured to pump heat from the first heat exchange element to the second heat exchange element.

2. The system of claim 1 wherein cooling fluid is resident within the heat exchange cavity.

3. The system of claim 2 wherein the cooling fluid includes liquid nitrogen, and wherein the stored fluid is resident within the fluid storage volume of the fluid storage vessel and includes a cryogenic fluid other than liquid nitrogen.

4. The system of claim 1 further comprising a pressure relief valve coupled with the temperature control jacket and adjustable between a first state where the heat exchange cavity is in fluid communication with the fluid storage volume of the fluid storage vessel, and a second state where the heat exchange cavity is blocked from fluid communication with the fluid storage volume.

5. The system of claim 1 wherein the electromagnetic element includes an electromagnetic coil within the heat exchange cavity.

6. The system of claim 5 wherein the drive mechanism includes a linear electric motor having a stator that includes the electromagnetic coil.

7. The system of claim 1 wherein the temperature control jacket is double walled and includes a vacuum space between an inner wall of the double wall and an outer wall of the double wall, and wherein the heat exchange cavity is fluidly sealed from the fluid storage volume of the fluid storage vessel.

8. The system of claim 1 wherein the machine includes a combustion engine, and the fluid storage vessel includes a cryogenic fuel storage vessel structured for containing a cryogenic fluid hydrocarbon fuel for fueling the engine, and further comprising a vaporizer positioned fluidly between the fluid storage vessel and the combustion engine.

9. A submersible pumping system comprising:
    a housing having a pumping chamber positioned fluidly between a pumping inlet and a pumping outlet;
    a pumping element movable within the pumping chamber to transition a fluid from the pumping inlet to the pumping outlet;
    a drive mechanism for actuating the pumping element, and including an electromagnetic element having an electrical conducting state above a critical temperature, and an electrical superconducting state at or below the critical temperature;
    the drive mechanism further including a temperature control jacket forming a heat exchange cavity about the electromagnetic element; and a cooler coupled with the temperature control jacket and structured to pump heat from the heat exchange cavity to maintain the electromagnetic element at or below the critical temperature, wherein the cooler includes a first heat exchange element within the heat exchange cavity, and a second heat exchange element outside the heat exchange cavity and structured to pump heat to a fluid storage volume of a fluid storage vessel, and the cooler is structured to pump heat from the first heat exchange element to the second heat exchange element.

10. The system of claim 9 wherein the drive mechanism includes a linear electric motor, and the electromagnetic element includes an electromagnetic coil of the linear electric motor positioned within the heat exchange cavity.

11. The system of claim 10 wherein the linear electric motor further includes a second electromagnetic element inductively coupled with the first electromagnetic element, and wherein the temperature control jacket envelops the first electromagnetic element but not the second electromagnetic element.

12. The system of claim 9 wherein the temperature control jacket is double walled and includes a vacuum space between an inner wall of the double wall and an outer wall of the double wall.

13. The system of claim 12 further comprising a pressure relief valve coupled with the temperature control jacket and adjustable between a first state where the heat exchange cavity is in fluid communication with an ambient environment external to the temperature control jacket, and a second state where the heat exchange cavity is blocked from the ambient environment.

14. A method of operating a fluid system comprising:
pumping heat from a coolant in heat transference contact with a drive mechanism of a pumping system submerged in a stored fluid within a storage vessel in the fluid system;
cooling an electromagnetic element of the drive mechanism by way of the pumping of the heat from an ambient temperature of the stored fluid to or below a critical temperature of a material forming the electromagnetic element;
energizing the electromagnetic element while cooled to or below the critical temperature; and
pumping the heat from the coolant into the stored fluid by way of a cooler having a first heat exchange element in heat transference contact with the coolant and a second heat exchange element in heat transference contact with the stored fluid.

15. The method of claim 14 wherein the coolant is within a temperature control jacket enveloping the electromagnetic element.

16. The method of claim 14 wherein the stored fluid includes cryogenic fluid hydrocarbon fuel.

17. The method of claim 16 further comprising moving a second electromagnetic element coupled with a pumping element in the pumping mechanism to pump the cryogenic fluid hydrocarbon fuel from the storage vessel to a fluid conduit coupled with an internal combustion engine.

* * * * *